United States Patent
Yamamoto et al.

(10) Patent No.: US 11,929,640 B2
(45) Date of Patent: Mar. 12, 2024

(54) STATOR, MOVEMENT, TIMEPIECE, METHOD FOR MANUFACTURING MOVEMENT AND METHOD FOR MANUFACTURING STATOR

(71) Applicant: Seiko Instruments Inc., Chiba (JP)

(72) Inventors: Kosuke Yamamoto, Chiba (JP); Shinji Kinoshita, Chiba (JP); Hitoshi Takeuchi, Chiba (JP); Tatsuya Omura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 775 days.

(21) Appl. No.: 17/022,918

(22) Filed: Sep. 16, 2020

(65) Prior Publication Data
US 2021/0091607 A1    Mar. 25, 2021

(30) Foreign Application Priority Data

Sep. 24, 2019   (JP) .................................. 2019-172905

(51) Int. Cl.
| | | |
|---|---|---|
| H02K 1/14 | (2006.01) | |
| G04C 3/14 | (2006.01) | |
| H02K 15/02 | (2006.01) | |
| H02K 37/16 | (2006.01) | |
| G04C 3/12 | (2006.01) | |

(52) U.S. Cl.
CPC .............. H02K 1/143 (2013.01); G04C 3/14 (2013.01); H02K 15/022 (2013.01); H02K 37/16 (2013.01); G04C 3/12 (2013.01)

(58) Field of Classification Search
None
See application file for complete search history.

(56) References Cited

U.S. PATENT DOCUMENTS

| | | |
|---|---|---|
| 4,270,066 A | 5/1981 | Terade et al. |
| 2005/0152063 A1 | 7/2005 | Hara et al. |
| 2006/0177999 A1* | 8/2006 | Hembree .......... H01L 21/76898 257/E21.597 |
| 2008/0022511 A1 | 1/2008 | Hara et al. |
| 2016/0209812 A1* | 7/2016 | Yamamoto ............... H02K 1/04 |
| 2019/0103789 A1 | 4/2019 | Yamamoto et al. |

FOREIGN PATENT DOCUMENTS

| | | |
|---|---|---|
| JP | S60-170430 A | 9/1985 |
| JP | 2019068724 A | 4/2019 |

OTHER PUBLICATIONS

Office Action in Japan Application No. 2019-172905, including English translation, date drafted Apr. 6, 2023, dated Apr. 25, 2023, 8 pages.

* cited by examiner

*Primary Examiner* — Renee S Luebke
*Assistant Examiner* — Matthew Hwang
(74) *Attorney, Agent, or Firm* — Crowell & Moring LLP

(57) ABSTRACT

A stator includes a magnetic plate material that has a main plate surface that is a surface to face a main plate of a movement when assembled to the main plate and that has a rotor accommodating hole formed in a part thereof; and a non-magnetic region that is made non-magnetic by applying chromium on the main plate surface around the rotor accommodating hole and irradiating the chromium with a laser from the main plate surface side.

9 Claims, 18 Drawing Sheets

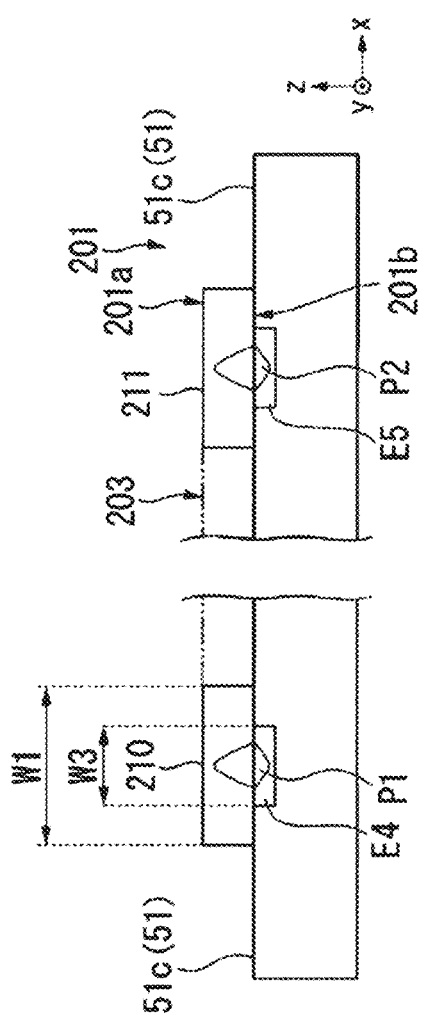

STATOR, MOVEMENT, TIMEPIECE, METHOD FOR MANUFACTURING MOVEMENT AND METHOD FOR MANUFACTURING STATOR

RELATED APPLICATIONS

This application claims priority to Japanese Patent Application No. 2019-172905, filed on Sep. 24, 2019, the entire content of which is incorporated herein by reference.

BACKGROUND OF THE INVENTION

1. Field of the Invention

Embodiments of the present invention relate to a stator, a movement, a timepiece, a method for manufacturing a movement and a method for manufacturing a stator.

2. Description of the Related Art

In related art, a stepping motor is used as a power source for rotationally driving a pointer such as an hour hand or a minute hand in an analog electronic timepiece. In such stepping motor provided in an analog electronic timepiece, an integrated stator having a rotor accommodating hole in which a rotor is disposed is used. In this integrated stator, two narrow-width portions having a narrower width than other portions are provided at two positions around the rotor accommodating hole at an interval of 180°. By providing the narrow-width portions, the integrated stator is likely to be saturated with a magnetic flux.

A technique of forming a non-magnetic region by forming a Cr diffusion region in a part of a magnetic path provided around the rotor accommodating hole of the stator to reduce magnetic permeability of the region is known. The non-magnetic region can be formed by disposing a Cr material for melting and diffusion in the stator and irradiating the Cr material with a laser to melt and diffuse the Cr material inside the magnetic path. (See, for example, JP-A-2019-68724 (Patent Literature 1))

However, according to the related technique described in Patent Literature 1, a protrusion (dross) is generated on a laser irradiation surface. Since the stator becomes thick due to the dross, a problem occurs that the dross of the stator and a train wheel installed on an upper side of the stator are in contact with each other.

In order to prevent contact between the stator and the train wheel, it is conceivable to remove the dross, but it takes time and cost to remove the dross.

SUMMARY OF THE INVENTION

Embodiments of the present invention are made in view of such a situation, and an object thereof is to provide a stator, a movement, a timepiece that can be assembled without removing a dross, a method for manufacturing a movement and a method for manufacturing a stator.

A stator according to one aspect of the present invention includes a magnetic plate material that has a main plate surface that is a surface to face a main plate of a movement when assembled to the main plate and that has a rotor accommodating hole formed in a part thereof; and a non-magnetic region that is made non-magnetic by applying chromium on the main plate surface around the rotor accommodating hole and irradiating the chromium with a laser from the main plate surface side.

The stator according to one aspect of the present invention may further include a portion subjected to shearing processing by bringing a fixed die into contact with the main plate surface and a movable die into contact with a back surface of the main plate surface.

A movement according to one aspect of the present invention includes the above stator; and the main plate having a concave notch at a position facing the non-magnetic region of the stator.

A timepiece according to one aspect of the present invention includes any one of the above movement.

A method for manufacturing a movement according to one aspect of the present invention includes a process of installing the main plate surface of any one of the above stator so as to face a main plate.

A method for manufacturing a stator according to one aspect of the present invention includes applying chromium on one surface of the magnetic plate material around a rotor accommodating hole; and forming a non-magnetic region on the magnetic plate material by irradiating the chromium with a laser from the one surface side. In the method for manufacturing a stator, the one surface is a main plate surface to face a main plate of a movement.

BRIEF DESCRIPTION OF THE DRAWINGS

FIG. 15C is a cross-sectional view corresponding to FIG. 12B showing the stator in the state of being screwed to the main plate.

DETAILED DESCRIPTION OF THE PREFERRED EMBODIMENTS

Figure 1:
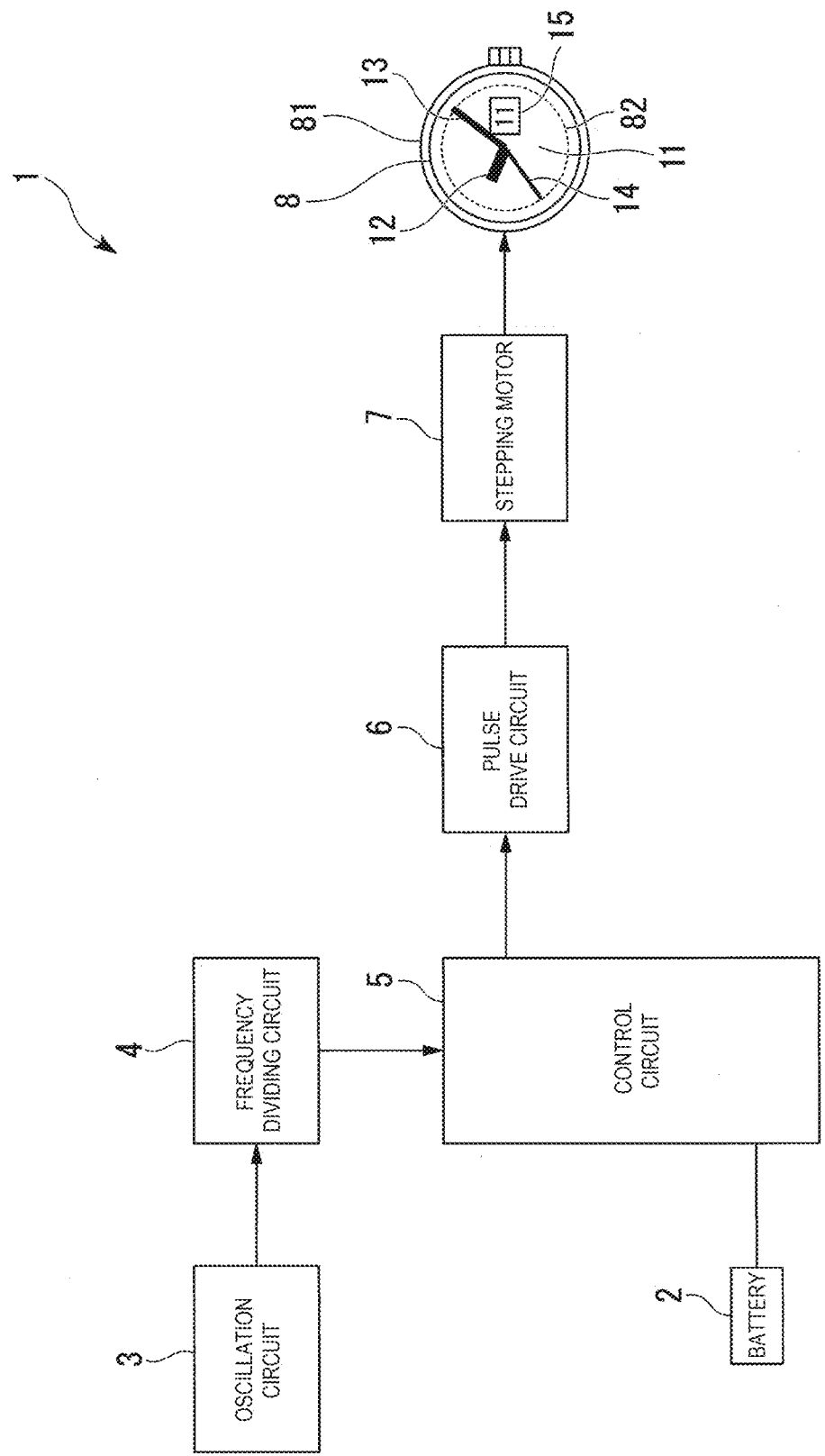
FIG. 1 is a block diagram showing a timepiece using a stepping motor and a timepiece movement according to the present embodiment.

Hereinafter, embodiments of the present invention will be described with reference to the drawings. In the drawings used in the following description, a scale of each member is appropriately changed in order to make each member recognizable.

FIG. 1 is a block diagram showing a timepiece 1 using a stepping motor and a timepiece movement according to the present embodiment. In the present embodiment, an analog electronic timepiece will be described as an example of the timepiece.

As shown in FIG. 1, the timepiece 1 includes a battery 2, an oscillation circuit 3, a frequency dividing circuit 4, a control circuit 5, a pulse drive circuit 6, a stepping motor 7, and an analog timepiece unit 8.

The analog timepiece unit 8 includes a train wheel 11, an hour hand 12, a minute hand 13, a second hand 14, a calendar display unit 15, a timepiece case 81, and a timepiece movement 82 (hereinafter, referred to as the movement 82). In the present embodiment, when one of the hour hand 12, the minute hand 13, the second hand 14, and the calendar display unit 15 is not specified, it is referred to as a pointer 16.

The oscillation circuit 3, the frequency dividing circuit 4, the control circuit 5, the pulse drive circuit 6, the stepping motor 7, and the train wheel 11 are components of the movement 82. A module provided with the stepping motor 7 and the train wheel 11 is also referred to as a mechanism module 83.

In general, a timepiece mechanical body including a device such as a time reference of the timepiece 1 is referred to as a movement. An electronic movement may be referred to as a module. In a completed state of the timepiece, for example, a dial and a pointer are attached to the movement, and the movement is accommodated in the timepiece case 81.

The battery 2 is, for example, a lithium battery or a so-called button battery. The battery 2 may be a solar cell and a storage battery that stores electric power generated by the solar cell. The battery 2 supplies the electric power to the control circuit 5.

The oscillation circuit 3 is a passive element that utilizes, for example, a piezoelectric phenomenon of crystal and is used to oscillate with a predetermined frequency due to mechanical resonance thereof. Here, the predetermined frequency is, for example, 32 kHz.

The frequency dividing circuit 4 frequency-divides a signal with a predetermined frequency output from the oscillation circuit 3 to a desired frequency, and outputs the frequency-divided signal to the control circuit 5.

The control circuit 5 uses the frequency-divided signal output from the frequency dividing circuit 4 to measure time, and generates a drive pulse based on a measured result. The control circuit 5 generates a drive pulse for forward rotation when the pointer 16 is moved in a forward rotation direction. The control circuit 5 generates a drive pulse for reverse rotation when the pointer 16 is moved in a reverse rotation direction. The control circuit 5 outputs the generated drive pulse to the pulse drive circuit 6.

The pulse drive circuit 6 generates a drive pulse for each pointer in accordance with a drive instruction output from the control circuit 5. The pulse drive circuit 6 outputs the generated drive pulse to the stepping motor 7.

The stepping motor 7 moves the pointer 16 (the hour hand 12, the minute hand 13, the second hand 14, and the calendar display unit 15) in accordance with the drive pulse output from the pulse drive circuit 6. In the example shown in FIG. 1, for example, one stepping motor 7 is provided for the hour hand 12, the minute hand 13, the second hand 14, and the calendar display unit 15. One stepping motor 7 may be provided for each of the hour hand 12, the minute hand 13, the second hand 14, and the calendar display unit 15.

Each of the hour hand 12, the minute hand 13, the second hand 14, and the calendar display unit 15 is moved by the stepping motor 7.

The hour hand 12 rotates once per 12 hours by the pulse drive circuit 6 driving the stepping motor 7. The minute hand 13 rotates once per 60 minutes by the pulse drive circuit 6 driving the stepping motor 7. The second hand 14 rotates once per 60 seconds by the pulse drive circuit 6 driving the stepping motor 7. The calendar display unit 15 is, for example, a pointer for displaying a date, and the calendar display unit 15 rotates so that the display of the calendar display unit 15 advances one day per 24 hours by the pulse drive circuit 6 driving the stepping motor 7.

Next, a schematic configuration example of the stepping motor 7 according to the present embodiment will be described.

Figure 2:
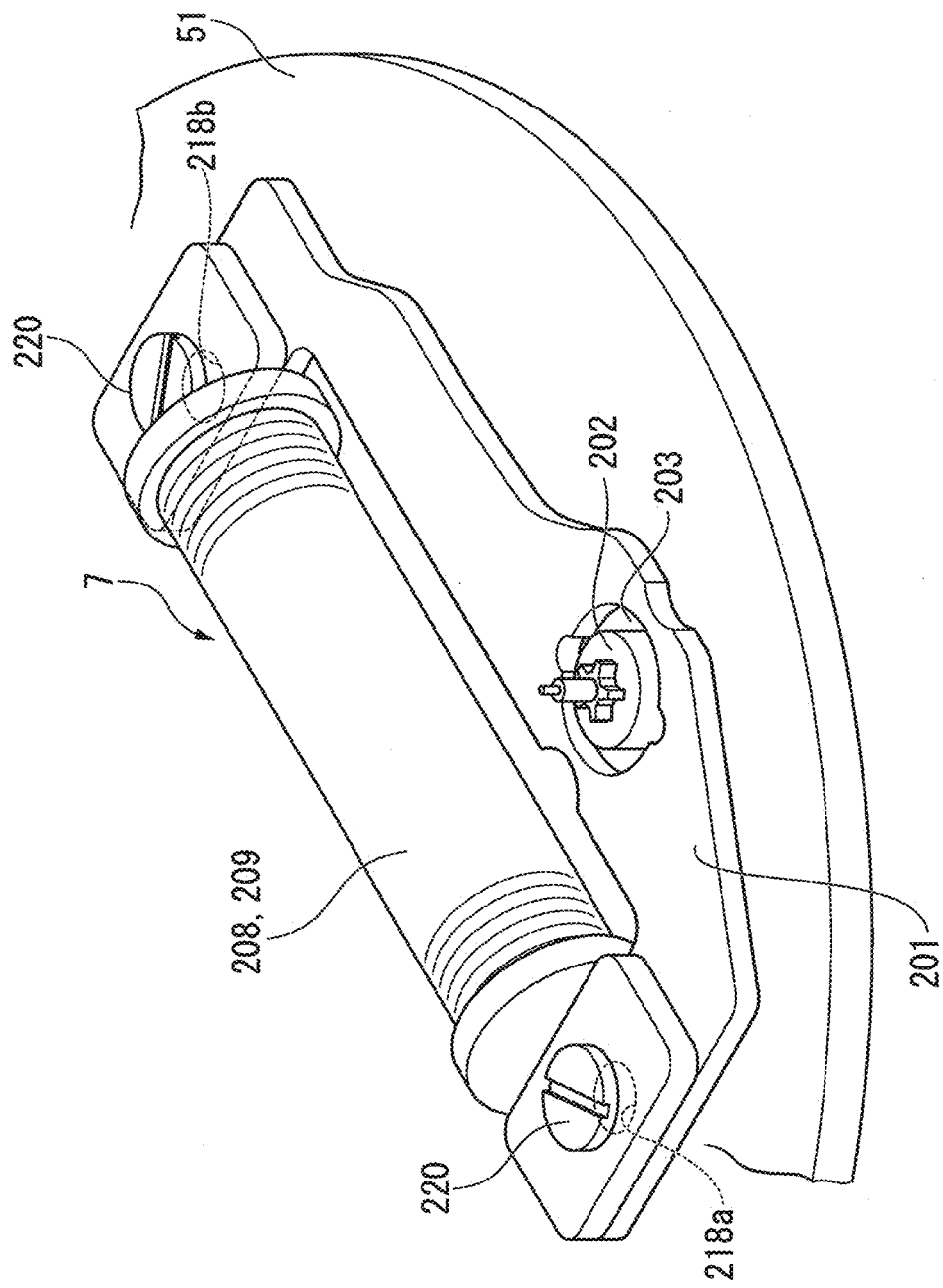
FIG. 2 is a perspective view showing a schematic configuration example of the stepping motor according to the present embodiment.

FIG. 2 is a perspective view showing the schematic configuration example of the stepping motor 7 according to the present embodiment. As shown in FIG. 2, the stepping motor 7 includes a stator 201, a rotor 202, a magnetic core 208, a coil 209, and a screw 220.

A rotor accommodating hole 203, a screw hole 218$a$, and a screw hole 218$b$ are formed in the stator 201.

The rotor 202 is rotatably disposed in the rotor accommodating hole 203.

The coil 209 is wound around the magnetic core 208.

When the stepping motor 7 is used in an analog electronic timepiece, the stator 201 and the magnetic core 208 are fixed to a main plate 51 of the movement 82 by screws 220, and are joined to each other.

Here, the stator 201 will be described with reference to FIG. 3.

Figure 3:
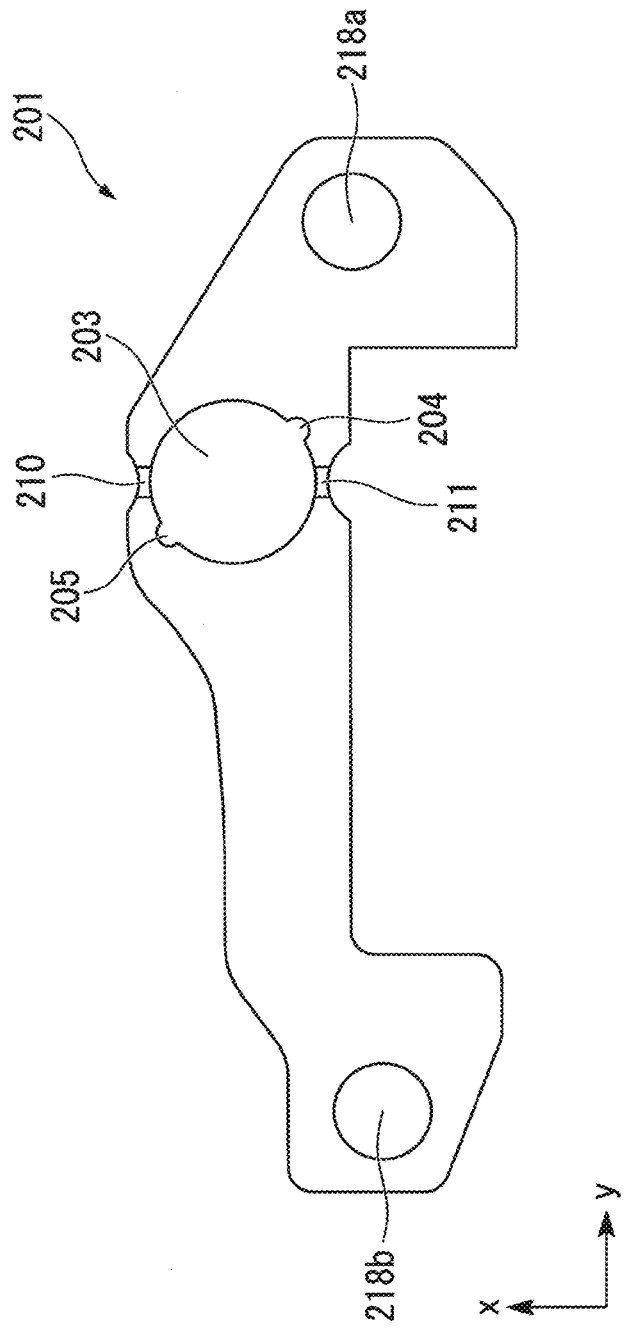
FIG. 3 is a schematic front view of a stator according to the present embodiment.

FIG. 3 is a schematic front view of the stator 201 according to the present embodiment. In FIG. 3, a longitudinal direction of the stator 201 is a y-axis direction and a transverse direction is an x-axis direction. As shown in FIG. 3, notch portions 204 and 205 are formed in the rotor accommodating hole 203. In addition, in the stator 201, narrow-width portions 210 and 211 are formed around the rotor accommodating hole 203. The stator 201 is formed of, for example, a magnetic plate material of iron-nickel (Fe—

Ni). The narrow-width portions 210 and 211 are non-magnetic regions. That is, the stator 201 is a single magnetic plate material having the rotor accommodating hole 203 formed in a part thereof. Here, the single magnetic plate material does not include a material obtained by joining two divided plate materials.

When the stepping motor 7 is used in the timepiece, an example of each size of the stator 201 will be described.

A hole diameter of the rotor accommodating hole 203 is about 1.5 mm to 2 mm. Narrowest portions of the narrow-width portions 210 and 211 have widths of about 0.1 mm to 0.2 mm. A thickness of the stator 201 is about 0.5 mm±0.1 mm. A length in the longitudinal direction is about 10 mm.

Next, the stepping motor 7 according to the present embodiment will be described in detail with reference to FIG. 4.

Figure 4:
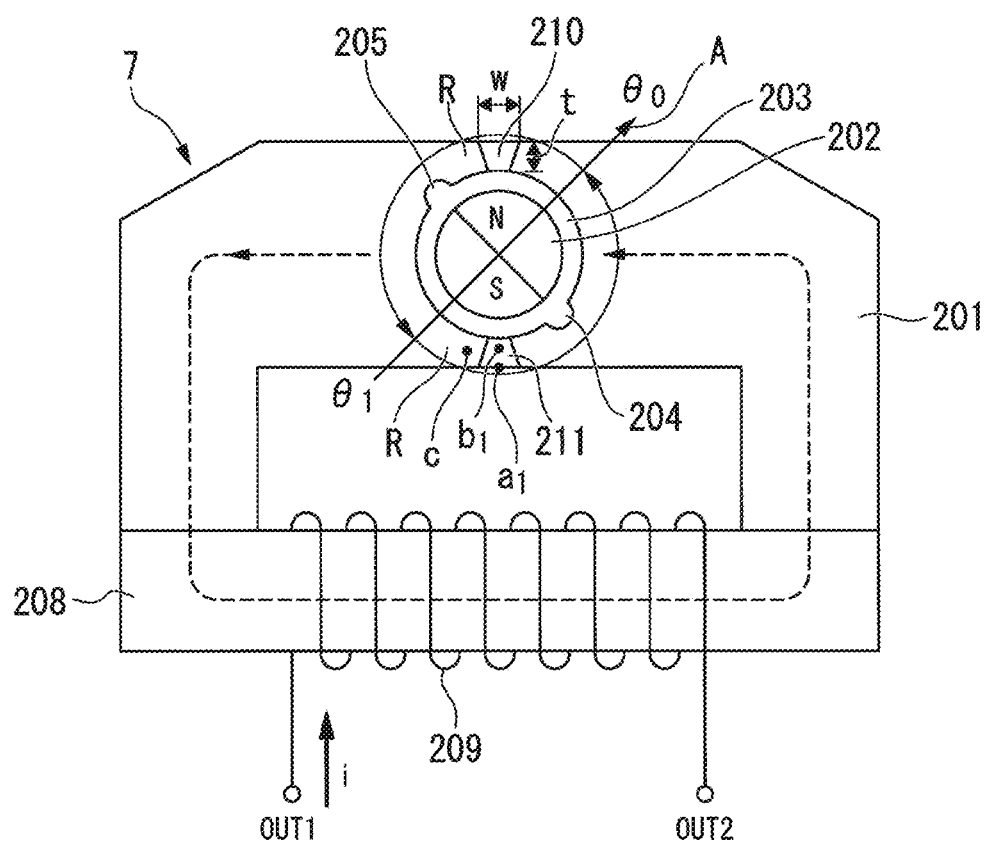
FIG. 4 is a schematic front view of the stepping motor according to the present embodiment.

FIG. 4 is a schematic front view of the stepping motor 7 according to the present embodiment.

The stepping motor 7 shown in FIG. 4 includes the rotor accommodating hole 203, the stator 201, the rotor 202, the magnetic core 208, the coil 209, and the narrow-width portions 210 and 211.

A magnetic path R is provided around the rotor accommodating hole 203 of the stator 201. The rotor 202 is a two-pole rotor rotatably disposed in the rotor accommodating hole 203. The magnetic core 208 is joined to the stator 201. The coil 209 is wound around the magnetic core 208.

The notch portions 204 and 205 are provided in the rotor accommodating hole 203 for securing a stable stop position of the rotor 202, and the narrow-width portions 210 and 211 are provided in portions that do not interfere with such notch portions 204 and 205. The coil 209 has a first terminal OUT1 and a second terminal OUT2.

The rotor accommodating hole 203 is a through hole formed in the stator 201 so as to have a circular contour. The notch portions (inner notches) 204 and 205 each have a half-moon shape, and a plurality of (two in the example of FIG. 4) notch portions are formed in opposing portions of the rotor accommodating hole 203. The notch portions 204 and 205 are formed as positioning portions for determining a stable stop position of the rotor 202. For example, the notch portion (inner notch) 204 may reduce potential energy of the rotor 202 when the rotor 202 is disposed in a predetermined position, thereby stabilizing the position of the rotor 202.

The rotor 202 is magnetized to have two poles (S pole and N pole). In a state in which the coil 209 is not excited, the rotor 202 is stably stopped. (stationary) at a position corresponding to the positioning portions as shown in FIG. 4. In other words, in a state in which the coil 209 is not excited, the rotor 202 is stably stopped (stationary) at a position where a magnetic pole axis A of the rotor 202 is orthogonal to a line segment connecting the notch portions 204 and 205 (position of an angle θ0).

The narrow-width portions 210 and 211, which are the non-magnetic regions, are formed in a part of the magnetic path R provided around the rotor accommodating hole 203 (two portions in the example of FIG. 4). Here, in the narrow-width portions 210 and 211 of the stator 201, a cross-sectional width in a direction perpendicular to the magnetic path is set as a cross-sectional width t, and a width in a direction along the magnetic path is set as a gap width w. The narrow-width portions 210 and 211 are formed in a region defined by the cross-sectional width t and the gap width w.

In the following description, a point in an outer periphery of the narrow-width portion 211 is defined as a point a1, a point inside the narrow-width portion 211 is defined as a point b1, and a point in a vicinity of the narrow-width portion 211 and between an outer periphery and an inner periphery of the magnetic path R is defined as a point c in the stator 201.

Next, an operation of the stepping motor 7 according to the present embodiment will be described with reference to FIG. 4.

First, when a drive pulse signal is supplied from the pulse drive circuit 6 (FIG. 1) to the terminals OUT1 and OUT2 of the coil 209 such that, for example, a first terminal OUT1 side is set as a positive electrode and a second terminal OUT2 side is set as a negative electrode, a current i flows in a direction of the arrow in FIG. 4, and a magnetic flux is generated in a direction of the dashed arrow in the stator 201.

In the present embodiment, the narrow-width portions 210 and 211, which are the non-magnetic regions, are formed, and magnetic resistance of the region is increased. Therefore, in the present embodiment, it is not necessary to magnetically saturate the region corresponding to the "narrow-width portion" in the related art, and magnetic flux leakage can be easily secured. After the magnetic flux leakage is secured, due to an interaction between magnetic poles occurred in the stator 201 and magnetic poles of the rotor 202, the rotor 202 rotates 180° in a direction of the arrow in FIG. 4, and is stably stopped (stationary) at a position where the magnetic pole axis faces an angle θ1.

A rotation direction for performing a normal operation (counterclockwise direction in FIG. 4) by rotationally driving the stepping motor 7 is a forward direction, and an opposite direction thereof (clockwise direction) is a reverse direction. Here, when the stepping motor 7 is applied to the analog electronic timepiece, the normal operation means a pointer-moving operation.

Next, when a drive pulse signal with reversed polarity is supplied from the pulse drive circuit 6 (FIG. 1) to the terminals OUT1 and OUT2 of the coil 209 such that, for example, the first terminal OUT1 side is set as the negative electrode and a second terminal OUT2 side is set as the positive electrode, a current flows in a direction opposite to the arrow in FIG. 4, and a magnetic flux is generated in a direction opposite to the dashed arrow in the stator 201.

Then, due to the interaction between the magnetic poles occurred in the stator 201 and the magnetic poles of the rotor 202, the rotor 202 rotates 180° in the same direction (forward direction) as described above, and is stably stopped (stationary) at a position where the magnetic pole axis faces the angle θ0.

Thereafter, by alternately supplying signals having different polarities (alternating signals) to the coil 209 in this manner, the above operation is repeatedly performed, and then the rotor 202 can continuously rotate in the direction of the arrow 180° each time.

Thus, since the narrow-width portions 210 and 211, which are the non-magnetic regions, are formed in a part of the magnetic path around the rotor accommodating hole 203, the magnetic flux consumed in the region can be greatly reduced, and the magnetic flux leakage for driving the rotor 202 can be efficiently secured.

In addition, by forming the narrow-width portions 210 and 211, which are the non-magnetic regions, in portions previously considered as "narrow-width portions" in the related art, consumption of the magnetic flux emitted from the rotor 202 itself in the region can be suppressed. As a result, a loss of a magnetic potential can be suppressed, and a holding force for magnetically stopping (stationary) and holding the rotor 202 can be increased.

In addition, so that after the portions previously considered as the "narrow-width portions" in the related art are saturated with the magnetic flux on the OUT1 side (negative electrode) to rotate the rotor 202, the rotor 202 is rotated by the magnetic flux on the OUT2 side (positive electrode), it is necessary to cancel a residual magnetic flux generated when the rotor 202 is rotated by saturation with the magnetic flux on the OUT1 side (negative electrode). However, according to the present embodiment, since the residual magnetic flux in the region is greatly reduced, no time is required for cancelling the residual magnetic flux, and the time required for the rotation of the rotor 202 until convergence can be shortened. Therefore, according to the present embodiment, it is possible to maintain an operation stability at the time of moving the pointer at a high speed, and to increase a drive frequency. The drive pulse for driving the stepping motor 7 will be described later.

<Description of Manufacturing Method>

Next, an example of the method for manufacturing the stator 201 will be described with reference to FIG. 5.

Figure 5:
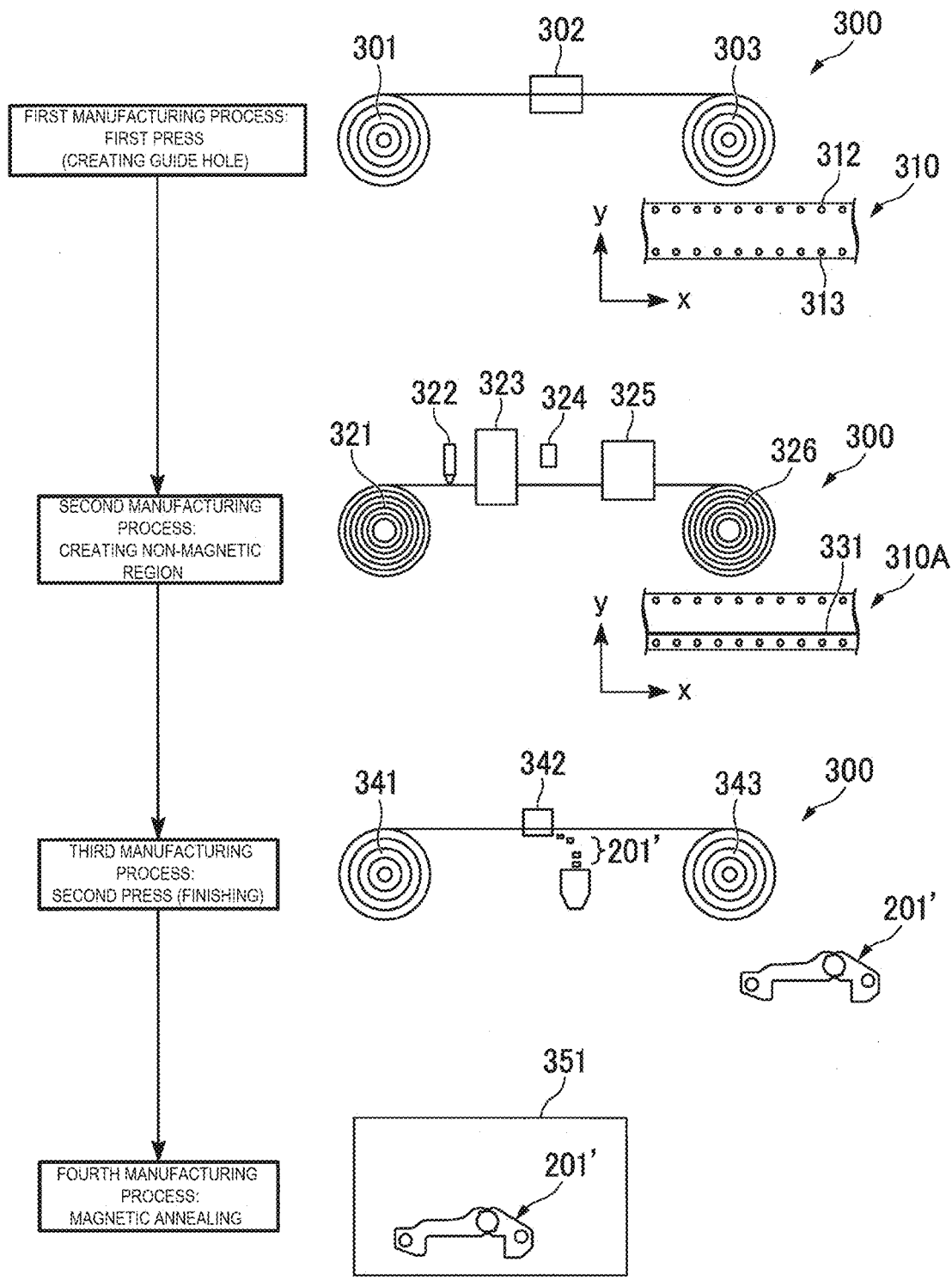
FIG. 5 is a diagram showing an example of a method for manufacturing a stator according to the present embodiment.

FIG. 5 is a diagram showing an example of the method for manufacturing a stator 201 according to the present embodiment.

(First Manufacturing Process First Press (Creating Guide Hole))

In a first manufacturing process, a manufacturing system 300 includes a press device 302. Reference numeral 301 indicates a state in which a hoop material 310 is wound before press. Reference numeral 303 indicates a state in which the hoop material is wound after the press. Reference numeral 310 indicates a top view of the hoop material after the press. In FIG. 5, a longitudinal direction of the hoop material is the x-axis direction, and a transverse direction is the y-axis direction. A width of the hoop material in the transverse direction is, for example, 16.5 mm.

The press device 302 forms guide holes 312 and 313 for determining positions up and down on a magnetic material (such as 38 permalloy) in a hoop material state. After the press, the manufacturing system 300 winds the hoop material after the press as indicated by reference numeral 303.

(Second Manufacturing Process Creating Non-Magnetic Region)

In a second manufacturing process, the manufacturing system 300 includes a paste application device 322 for paste-applying chromium (Cr), a drying device 323, a laser irradiation device 324, and a cleaning device 325. Reference numeral 321 indicates a state in which the hoop material is wound after the press in the first manufacturing process. Reference numeral 326 indicates a state in which the hoop material 310 is wound after the non-magnetic region is created.

The paste application device 322 paste-applies the chromium at a desired position in the y-axis direction with respect to the hoop material (application process) The paste application device 322, for example, mixes the chromium with a binder to form paste and dispense the paste. That is, the paste application device 322 is a dispenser. The desired position in the y-axis direction is a region in which the narrow-width portions 210 and 211, which are the non-magnetic regions in the stator 201 shown in FIG. 3, are created. The paste application device 322 paste-applies the chromium at desired positions based on the positions of the guide holes 312 and 313. An application thickness of the chromium is, for example, 150 μm to 200 μm.

Subsequently, the drying device 323 dries the paste-applied chromium.

Subsequently, the laser irradiation device 324 irradiates a region on which the chromium is paste-applied (reference numeral 331) with a laser (laser processing process). The laser is preferably a fiber laser having a deep discharge depth. Accordingly, the applied chromium is dissolved in a base material (permalloy material). Then, diffusion and melting are generated between the applied chromium and the chromium inside the permalloy material, and a region having a chromium weight ratio of 15 wt % or more is formed. Due to the laser irradiation, the temperature in the region paste-applied with the chromium becomes equal to or higher than melting points of the permalloy material and Cr (equal to or higher than 1900°). A caliber at an incident side of the laser is about 0.3 mm to 0.5 mm. In addition, the laser irradiation device 324 performs irradiation with the laser at an interval of, for example, 25 μm in the x-axis direction. Accordingly, heat applied to the base material (hoop material) by the laser irradiation can be reduced.

Subsequently, the cleaning device 325 removes unnecessary portions of the applied chromium by cleaning with a solvent. Reference numeral 310A is a top view showing the hoop material after being irradiated with a laser and cleaned. In the hoop material indicated by the reference numeral 310A, reference numeral 331 indicates the non-magnetic region. A width of the non-magnetic region 331 in the y-axis direction is about 0.3 mm to 0.5 mm. Thus, by the second manufacturing process, the straight non-magnetic region 331 along the x-axis direction with respect to the hoop material is formed at a predetermined position in the y-axis direction. The time required for cleaning is, for example, 5 minutes.

After cleaning, the manufacturing system 300 winds the hoop material after forming the non-magnetic region as indicated by the reference numeral 326.

(Third Manufacturing Process Second Press (Finishing))

In a third manufacturing process, the manufacturing system 300 includes a press device 342 serving as a finishing processing device. Reference numeral 341 indicates a state in which the hoop material is wound after the second manufacturing process. Reference numeral 343 indicates a state in which the hoop material is wound after the press.

Figure 6:
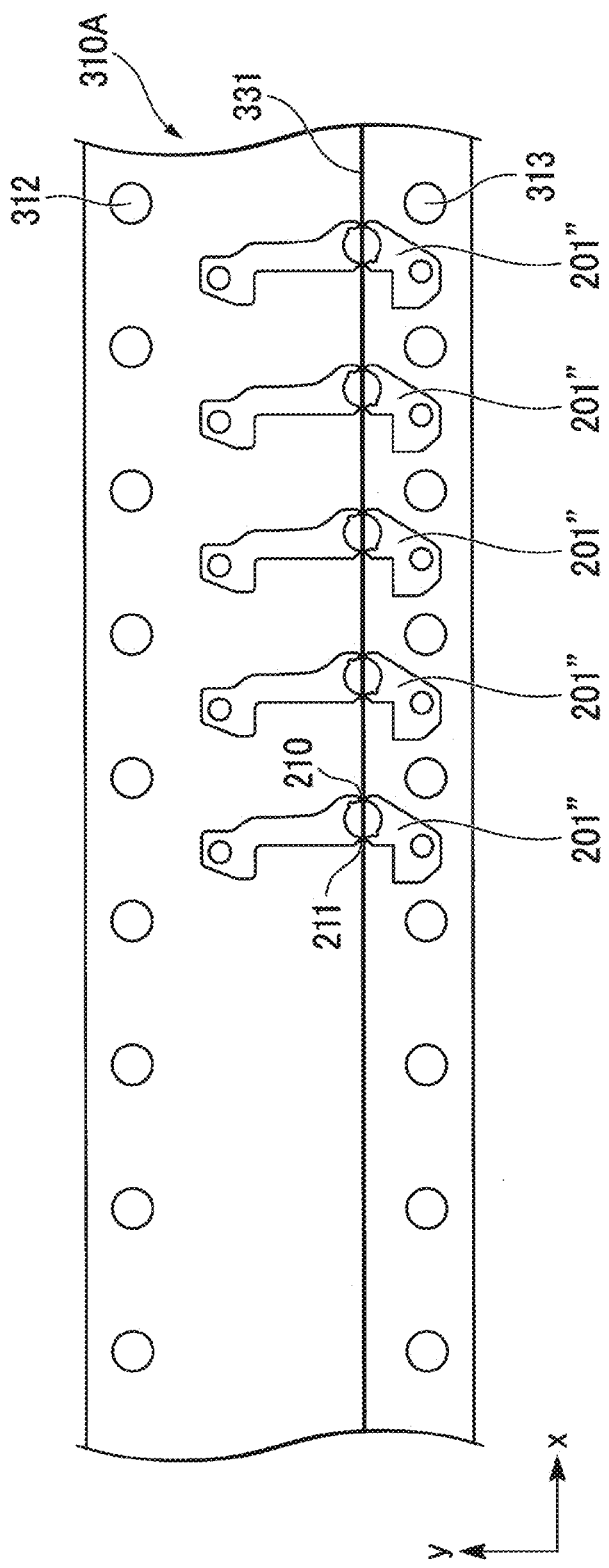
FIG. 6 is a top view showing a hoop material before press of the stator according to the present embodiment.

As shown in FIG. 6, the press device 342 adjusts the position of the hoop material 310A based on the positions of the guide holes 312 and 313 so that portions where the chromium weight ratio becomes 15 wt % or more become the narrow-width portions 210 and 211 of the stator 201 and performs press-punching. FIG. 6 is a top view showing a hoop material 310A before press of the stator 201 according to the present embodiment. A stator 201' is a stator before a fourth manufacturing process. In FIG. 6, reference numeral 201" indicates a position at which the stator 201' is pressed. The press-punching is a process of punching a part of the non-magnetic region 331 and punching the hoop material 310A so as to have a shape surrounding the rotor 202 for the stepping motor 7. That is, the stator 201' including the rotor accommodating hole 203 is formed by the third manufacturing process.

Accordingly, an outer shape of the stator 201' having different chromium weight ratios at the narrow-width portions 210 and 211 and the other portions is completed.

(Fourth Manufacturing Process Magnetic Annealing)

In the fourth manufacturing process, the manufacturing system 300 includes an annealing furnace 351.

The annealing furnace 351 performs high-temperature annealing on the stator 201'. Accordingly, residual stress due to press processing in the third manufacturing process is removed or relaxed.

The manufacturing system 300 manufactures the stator 201 shown in FIG. 3 by the first manufacturing process to the fourth manufacturing process above.

According to the stator 201 manufactured in the above manufacturing processes, thermal deformation due to the laser irradiation can be reduced during formation of the non-magnetic region.

<Description of Example of Photograph of Cross Section of Hoop Material after Laser Irradiation>

Figure 7:
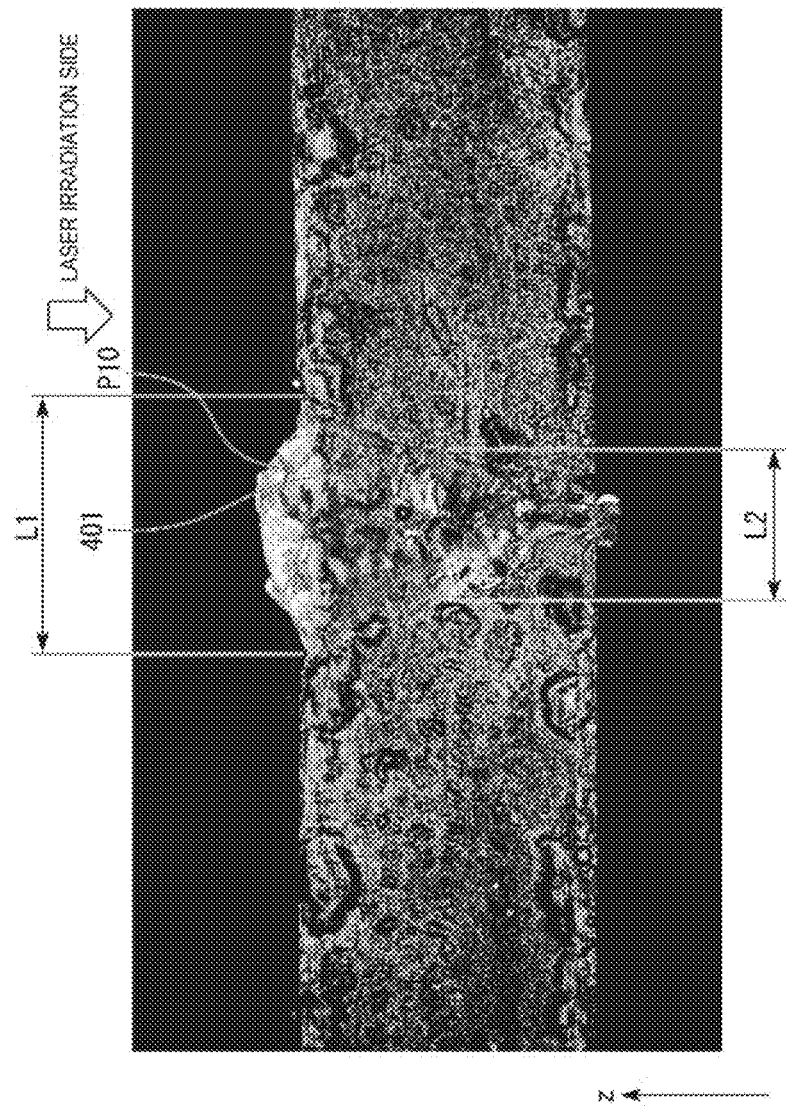
FIG. 7 is a diagram showing an example of a photograph of a cross section of the hoop material after chromium applied to the hoop material of permalloy is melted and diffused by a laser to make the chromium 15 wt % or more in the present embodiment.
Figure 8:
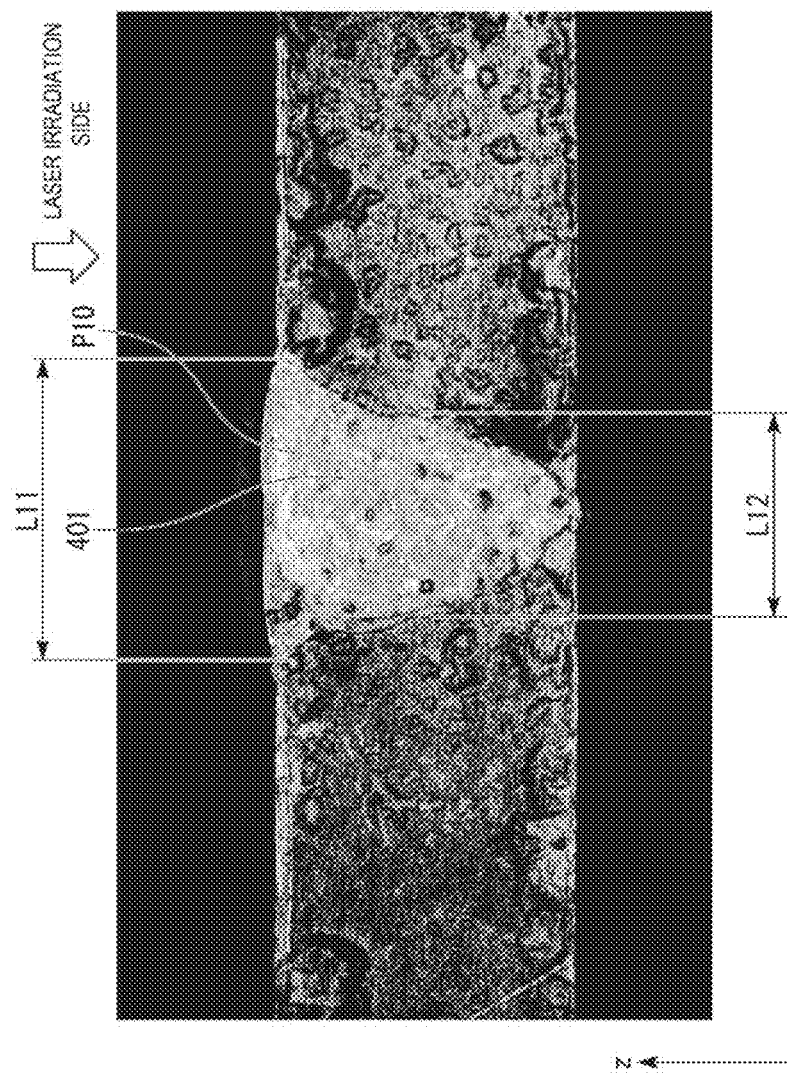
FIG. 8 is a diagram showing an example of a photograph of a cross section of the hoop material after the chromium applied to the hoop material of the permalloy is melted and diffused by a laser to make the chromium 15 wt % or more in the present embodiment.
Figure 9:
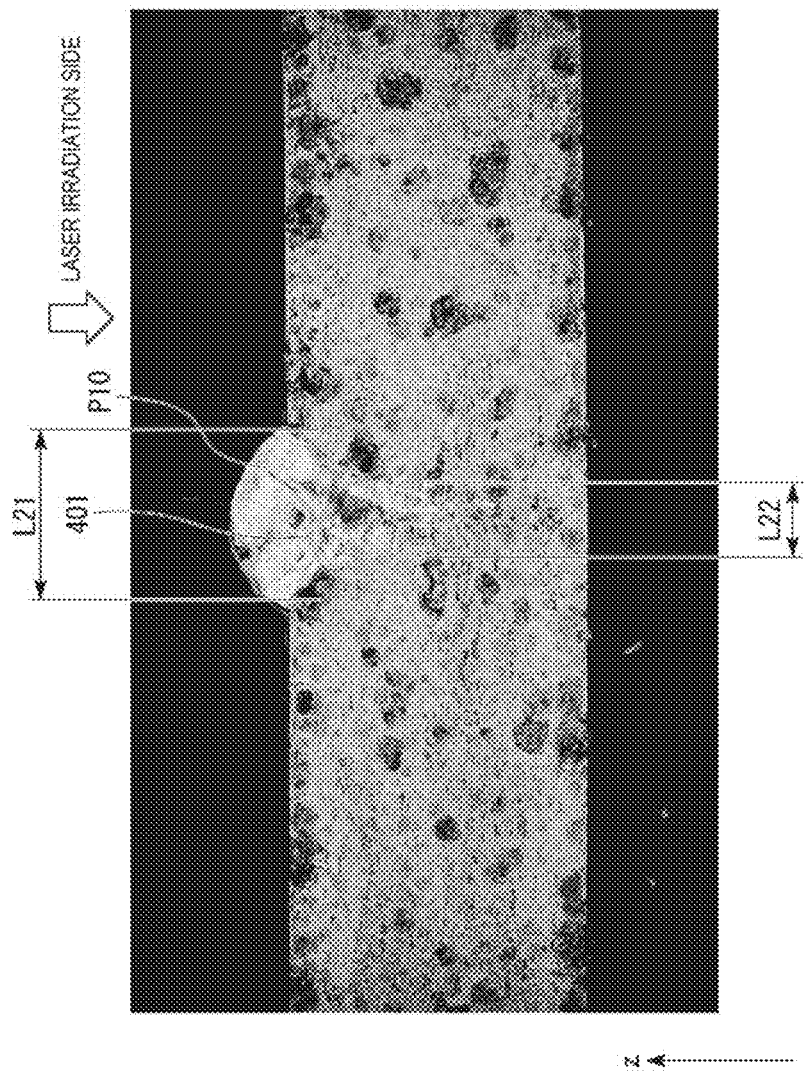
FIG. 9 is a diagram showing an example of a photograph of a cross section of the hoop material after the chromium applied to the hoop material of the permalloy is melted and diffused by a laser to make the weight ration of the chromium 15 wt % or more in the present embodiment.

Next, FIGS. 7 to 9 show examples of photographs of cross sections of the hoop material after the chromium applied to one surface of the hoop material made of the permalloy is irradiated with the laser, and melted and diffused by the laser to make the weight ration of the chromium 15 wt % or more. Each of FIGS. 7 to 9 shows an example of a photograph of a cross section of the hoop material after the chromium applied to the hoop material made of the permalloy is melted and diffused by the laser to make the weight ration of the chromium 15 wt % or more in the present embodiment.

In FIGS. 7 to 9, a vertical direction (z-axis direction) is a thickness direction of the hoop material. The laser is irradiated from a surface (upper surface) on which the chromium is applied. A thickness of the hoop material is, for example, 0.5 mm±0.1 mm. In FIGS. 7 to 9, reference numeral 401 denotes a melting portion melted by the laser irradiation.

A dross 1'10 is a protrusion generated by the laser irradiation.

FIG. 7 shows an example in which the melting portion 401 penetrates from the upper surface to a lower surface. FIG. 8 shows an example in which the melting portion 401 reaches the lower surface. FIG. 9 shows an example in which the melting portion 401 does not reach the lower surface.

Reference numeral L1 in FIG. 7, reference numeral L11 in FIG. 8, and reference numeral L21 in FIG. 9 indicate widths of the melting portions 401 as viewed from a laser irradiation side respectively. Reference numeral L2 in FIG. 7, reference numeral L12 in FIG. 8, and reference numeral L22 in FIG. 9 indicate widths of the melting portions at centers in the thickness direction of the hoop material respectively.

As shown in FIGS. 7 to 9, when the melting portion 401 is manufactured in the hoop material by the manufacturing method of the present embodiment, the widths L1, L11, and L21 of the melting portions 401 at the incident side of the laser are wider than widths of the melting portions 401 other than a surface of the hoop material. In addition, the width of the melting portion 401 becomes narrower, and a cross-sectional area of the melting portion 401 becomes smaller from one surface side (upper side) of the hoop material which is a magnetic plate material toward the other surface side (lower side) in the thickness direction.

In any of the examples shown in FIGS. 7 to 9, the weight ration of the chromium in the melting portion 401 is 15 wt % or more, and the melting portion 401 is formed to be the non-magnetic region.

<Description of EDS Line Analysis Result>

Next, a result of EDS line analysis of the melting portion manufactured by the manufacturing method of the present embodiment will be described.

First, an outline of an energy dispersive X-ray spectroscopy (EDS) line analysis will be described.

When an X-ray is incident in an element, a charge proportional to energy of the X-ray is generated. An analyzing device that performs the EDS line analysis converts the charge to a current proportional to a charge amount obtained by accumulating the charge in, for example, a gate electrode of a field effect transistor. Then, the analyzing device converts a current change for each X-ray into a pulse and further measures a pulse number (X-ray count number) for each wave height by a multiple wave height analyzer. Further, the analyzing device converts a measurement result into a spectrum by taking an energy value (k eV) of the X-ray on a horizontal axis and the X-ray count number on a vertical axis (for example, see Reference Document 1).

Reference Document 1; "What is EDS analysis? How can a good analysis be conducted? (Basics of EDS analysis)", by Iwao Yamazaki, Bruker AXS Co., 2014, https//www.bruker.com/fileadmin/user_upload/8-PDF-Docs/X-rayDiffraction_ElementalAnalysis/Microanalysis_EBSD/Webinars/Bruker_Japanese_Webinar_2014-11-25_EDS_Feature_Analysis.pdf#search=%27%EF%BC%A5%EF%BC%A4%EF%BC%B3%E3%83%A9%E3%82%A4%E3%83%B3%E5%88%86%E6%9E%90%27 (Internet search 2017 Sep. 10)

The analyzing device and analysis conditions are described.

A cross section polisher (CP) processing was performed on observation portions of the narrow-width portions 210 and 211 by using LB-09020 CP (trade name) manufactured by JEOL Ltd. An acceleration voltage was 7 kV.

As a scanning electron microscope, a field emission scanning electron microscope (FE-SEM) (trade name JSM-7800F, manufactured by JEOL Ltd.) was used.

After a resin embedding processing and a polishing processing, the sample was subjected to ion milling processing using IB-9020CP manufactured by JEOL Ltd.

The sample at the time of measurement was a cross section subjected to the ion milling processing {argon (Ar) ion, acceleration 7 kV}.

A measurement environment was in a vacuum with a vacuum degree of 10-4 Pa to 10-5 Pa.

The EDS line analysis was performed under the condition of a pressurizing voltage of 15 kV using NORAN SYSTEM7 (trade name), Ver3 manufactured by Thermo Fisher Scientific.

Next, an example of a result of the EDS line analysis of the melting portion is shown.

Figure 10A:
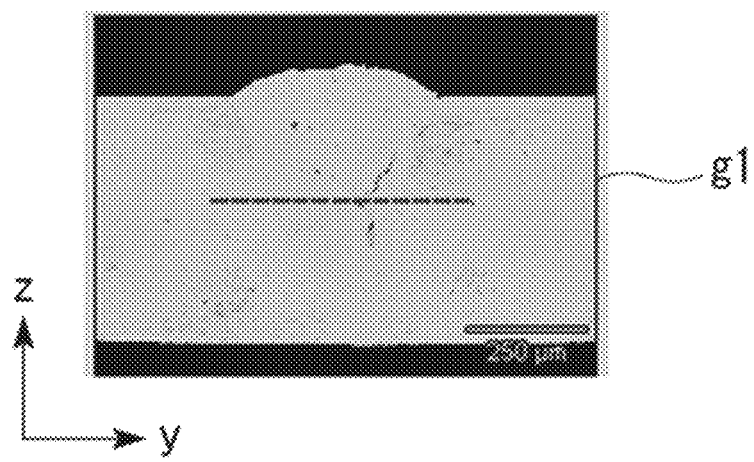
FIG. 10A is a diagram showing a melting portion according to the present embodiment.
Figure 10B:
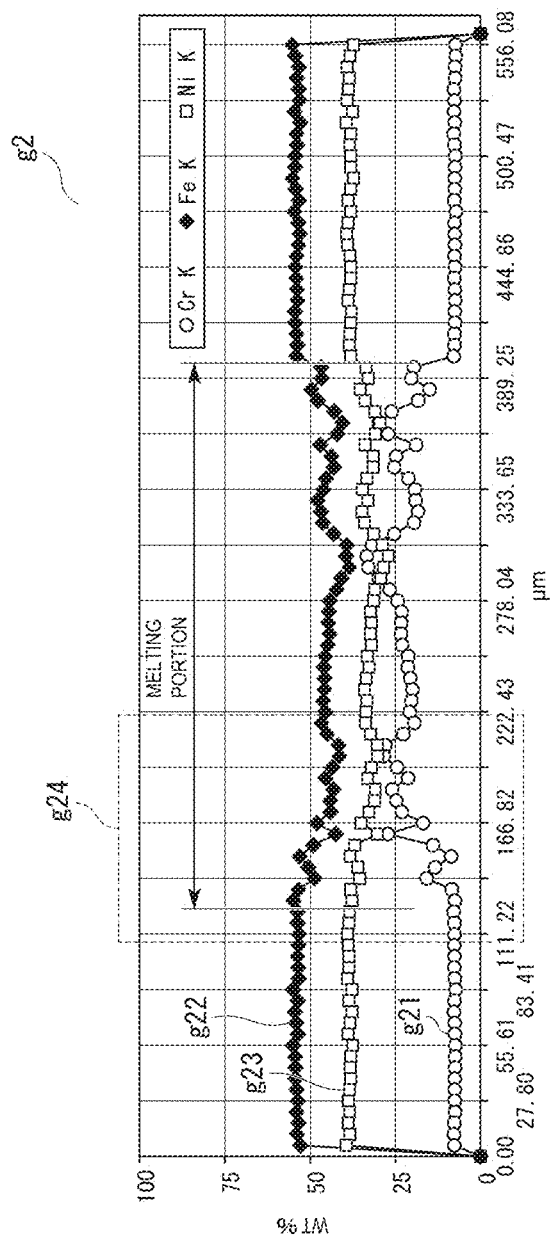
FIG. 10B is a graph showing a result of line analysis of the melting portion according to the present embodiment.

FIGS. 10A and 10B are diagrams showing examples of the result of the EDS line analysis of the melting portion according to the present embodiment. In FIG. 10A, a diagram shown by reference numeral g1 is a diagram showing the melting portion subjected to the EDS line analysis. The y-axis direction is, as shown in FIG. 3, the longitudinal direction of the stator 201. In addition, in FIG. 10A, the diagram shown by the reference numeral g1 is a result obtained by imaging a dissolving portion with a reflection microscope at a magnification of 120 times. In FIG. 10B, a graph shown by reference numeral g2 is a graph showing the result of the line analysis. The horizontal axis is position [μm], and the vertical axis is weight ratio. In addition, in FIG. 10B, reference numeral g21 represents a change in the weight ratio of the chromium (Cr) with respect to a distance, reference numeral g22 represents a change in the weight ratio of the iron (Fe) with respect to a distance, and reference numeral g23 represents a change in the weight ratio of the nickel (Ni) with respect to a distance. A region surrounded by broken line g24 is a region where the mass of the chromium changes.

In FIG. 10B, the melting portion is in a section of about 140 μm to 400 μm. In this section, the weight ratio of the chromium is about 20 wt % to 28 wt %. In this region, since the weight ratio of the chromium is 15 wt % or more, the region is paramagnetic at room temperature. The point b1 in FIG. 4 is this region. Paramagnetism is magnetism which does not have a magnetization when no external magnetic field exists, and magnetizes in a direction thereof when a magnetic field is applied. A paramagnetic state at room temperature is a non-magnetic state. In this region, the weight ratio of the iron is about 41 wt % to 51 wt %, and the weight ratio of the nickel is about 30 wt % to 38 wt %.

Here, the 38 permalloy, which is a Fe—Ni—Cr alloy containing 54 wt % iron, 38 wt % nickel and 8 wt % chromium, is ferromagnetic at room temperature. Ferromagnetism is magnetism of a substance having a magnetic moment.

In FIG. 10B, a region in which the weight ration of the chromium is about 8 wt % is a position from an outer edge side to about 140 μm and a position after 400 μm. Since the weight ration of the chromium in these regions is approximately 7 wt % to 8 wt %, which is equivalent to the weight ration of a chromium component of the 38 permalloy, these regions are ferromagnetic regions. The points a1 and c in FIG. 4 are these region.

As described above, the stator 201 manufactured in the manufacturing process of the present embodiment has the paramagnetic region where the weight ration of the chromium is 15 wt % or more, the ferromagnetic region where the weight ration of the chromium is 7 wt % to 8 wt %, and further the region where the weight ration of the chromium changes greatly (the region surrounded by the broken line g24 in FIG. 10B). Thus, the stator 201 manufactured in the manufacturing process of the present embodiment has a non-magnetic region (point b1 in FIG. 4). In the stator 201, a difference between the weight ration of chromium in the melting portion (X wt %) and the weight ration of chromium in the other regions (Y wt %) is 6 wt % or more (X-Y≥6), and the weight ration of chromium in the melting portion is greater than the weight ration of chromium in the base material.

As shown in FIG. 10B, the weight ration of chromium in the non-magnetic melting region is 6 wt % to 18 wt % greater than 8 wt % which is the weight ration of chromium in the magnetic plate material excluding the non-magnetic melting region.

Figure 11:
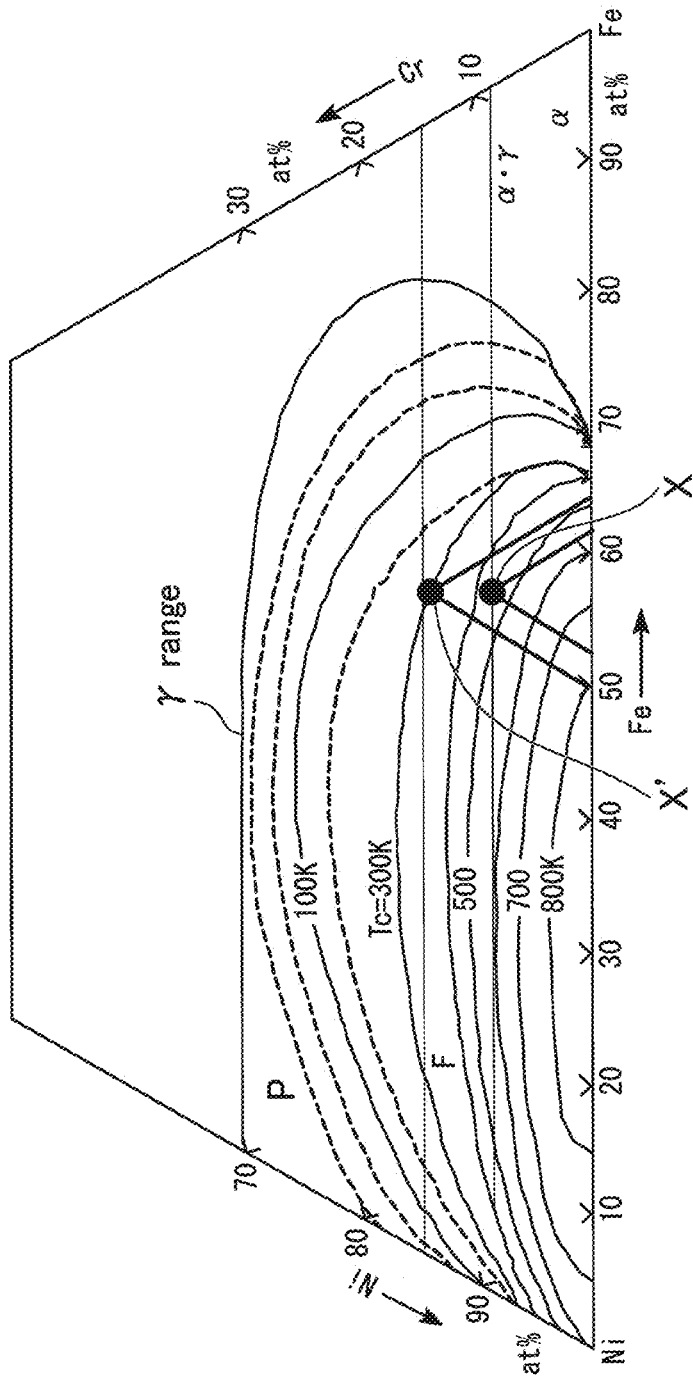
FIG. 11 is a state diagram of a ternary alloy of Fe—Ni—Cr.

In the stepping motor 7 according to the present embodiment, the stator 201 is made of a Fe—Ni alloy, but is preferably made of a Fe—Ni alloy having a high magnetic permeability. For example, the above-described 38 permalloy can be exemplified. From a state diagram of FIG. 11, a Curie temperature of Fe-38% Ni-8% Cr is 500 K or higher (point X), but when the weight ratio of Cr is 15 wt % or more, the Curie temperature becomes 300 K. That is, when the weight ratio of Cr is 15 wt % or more, an austenite phase is formed at room temperature (point X'). FIG. 11 is a state diagram of a ternary alloy of Fe—Ni—Cr. That is, at a temperature around room temperature where the stepping motor 7 is required to be driven, a non-magnetic state of the stator 201 can be secured when the weight ration of Cr is 15 wt % or more. FIG. 11 is a state diagram quoted from item 188 of Ternary alloys Between Fe, Co or Ni and Ti, V, Cr or Mn (Landolt-Bornstein new Series III/32A).

<Cross-Sectional Shape of Stator 201>

Figure 12A:
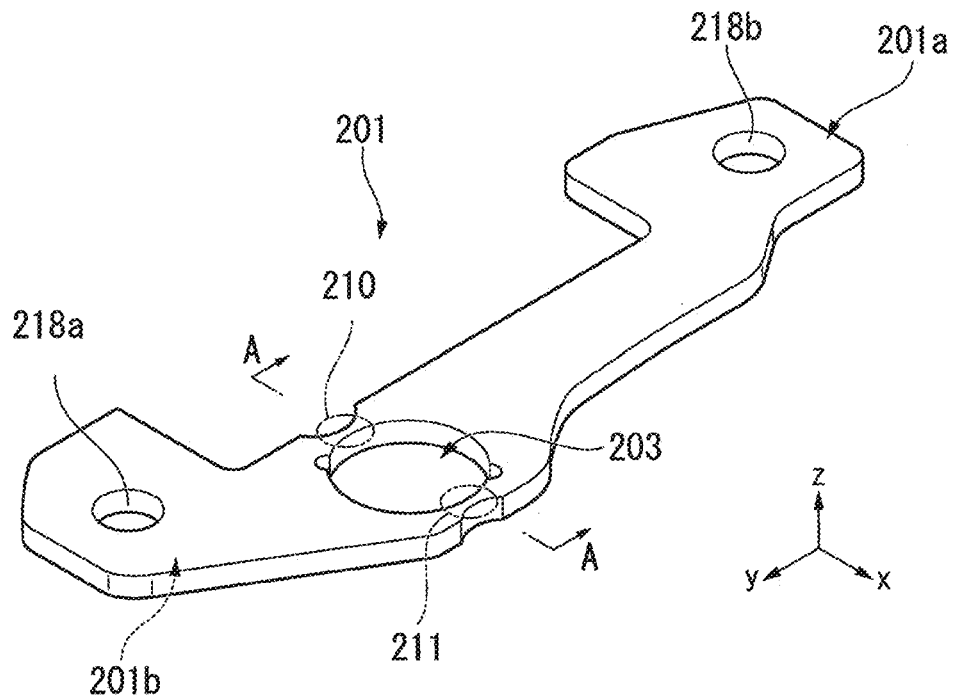
FIG. 12A is a perspective view showing the stator according to the present embodiment.
Figure 12B:
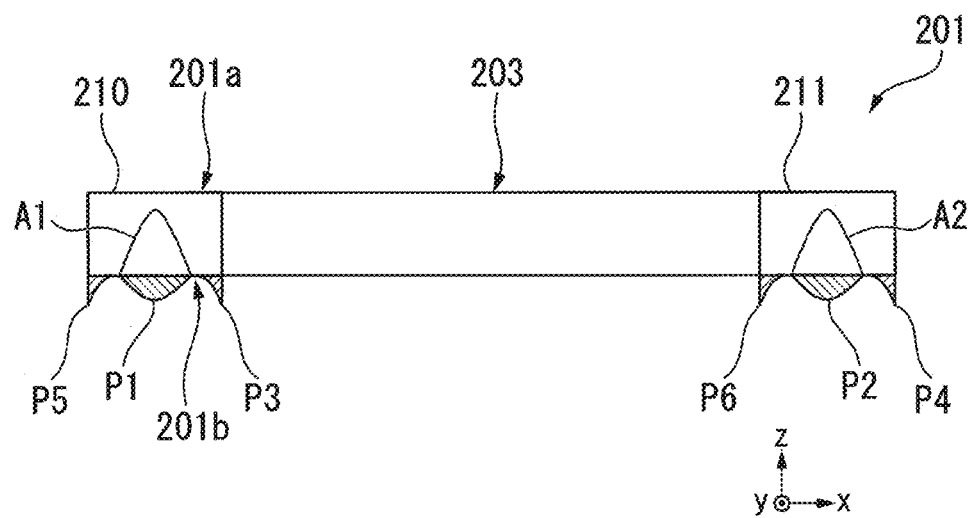
FIG. 12B is a cross-sectional view of the stator taken along a line A-A of FIG. 12A.

FIGS. 12A and 12B are diagrams showing the protrusion generated on the stator according to the present embodiment.

FIG. 12A is a perspective view showing the stator 201 according to the present embodiment. In FIG. 12A, the longitudinal direction of the stator 201 is the y-axis direction, the transverse direction is the x-axis direction, and a thickness direction is the z-axis direction.

The stator 201 has a train wheel surface 201a which is a surface to face the train wheel 11 when incorporated into the movement. The stator 201 has a main plate surface 201b that is a surface to face the main plate 51 when assembled to the main plate 51 of the movement. In the stator 201, the train wheel surface 201a is a back surface of the main plate surface 201b.

In order to avoid that the train wheel surface 201a and the main plate surface 201b are incorporated in reverse when assembled, it is preferable that the stator 201 is left-right asymmetric.

The narrow-width portion 210 and the narrow-width portion 211 include processing positions where the chromium is applied and is irradiated with the laser in the above second manufacturing process. The main plate surface 201b is a surface on a side which is applied with the chromium and is irradiated with the laser in the second manufacturing process. That is, the narrow-width portion 210 and the narrow-width portion 211 include non-magnetic regions that are made non-magnetic by being irradiated with the laser from a main plate surface 201b side.

The rotor accommodating hole 203 of the stator 201 is formed by performing the press-punching by the press device 342 in the above third manufacturing process. In the press device 342, a fixed die (hereinafter, also referred to as a die) is in contact with the main plate surface 201b side of the stator 201. In addition, in the press device 342, a movable die (hereinafter, also referred to as a punch) is in contact with a train wheel surface 201a side of the stator 201.

That is, the rotor accommodation hole 203 is formed by disposing the die on the main plate surface 201b side and the punch on the train wheel surface 201a side and performing shearing processing with the die and punch disposed in this way. In this example, the outer shape, the screw hole 218a, and the screw hole 218b are also formed by the shearing processing similarly to the rotor accommodating hole 203.

FIG. 12B is a cross-sectional view of the stator 201 taken along a line A-A of FIG. 12A. In FIG. 12B, the transverse direction of the stator 201 is the x-axis direction, and the thickness direction is a z-axis.

The narrow-width portion 210 and the narrow-width portion 211 are provided around the rotor accommodating hole 203.

A Cr diffusion region A1 is formed in the narrow-width portion 210 by applying the chromium and irradiating with the laser in the above second manufacturing process. As the Cr diffusion region A1 is formed, a dross P1 is formed on the main plate surface 201b side of the narrow-width portion 210. For the similar reason, a dross P2 is formed on the main plate surface 201b side of the narrow-width portion 211.

The Cr diffusion region A1, a Cr diffusion region A2, the dross P1, and the dross P2 are the melting portions 401 in FIGS. 7 to 9.

A burr P3 generated when the rotor accommodating hole 203 is punched in the above third manufacturing process is generated on the main plate surface 201b side of the narrow-width portion 210. For the similar reason, a burr P6 is generated on the main plate surface 201b side of the narrow-width portion 211.

A burr P5 generated when the outer shape is punched is generated on the main plate surface 201b side of the narrow-width portion 210. For the similar reason, a burr P4 is generated on the main plate surface 201b side of the narrow-width portion 211.

<Mechanism Module 83>

Figure 13:
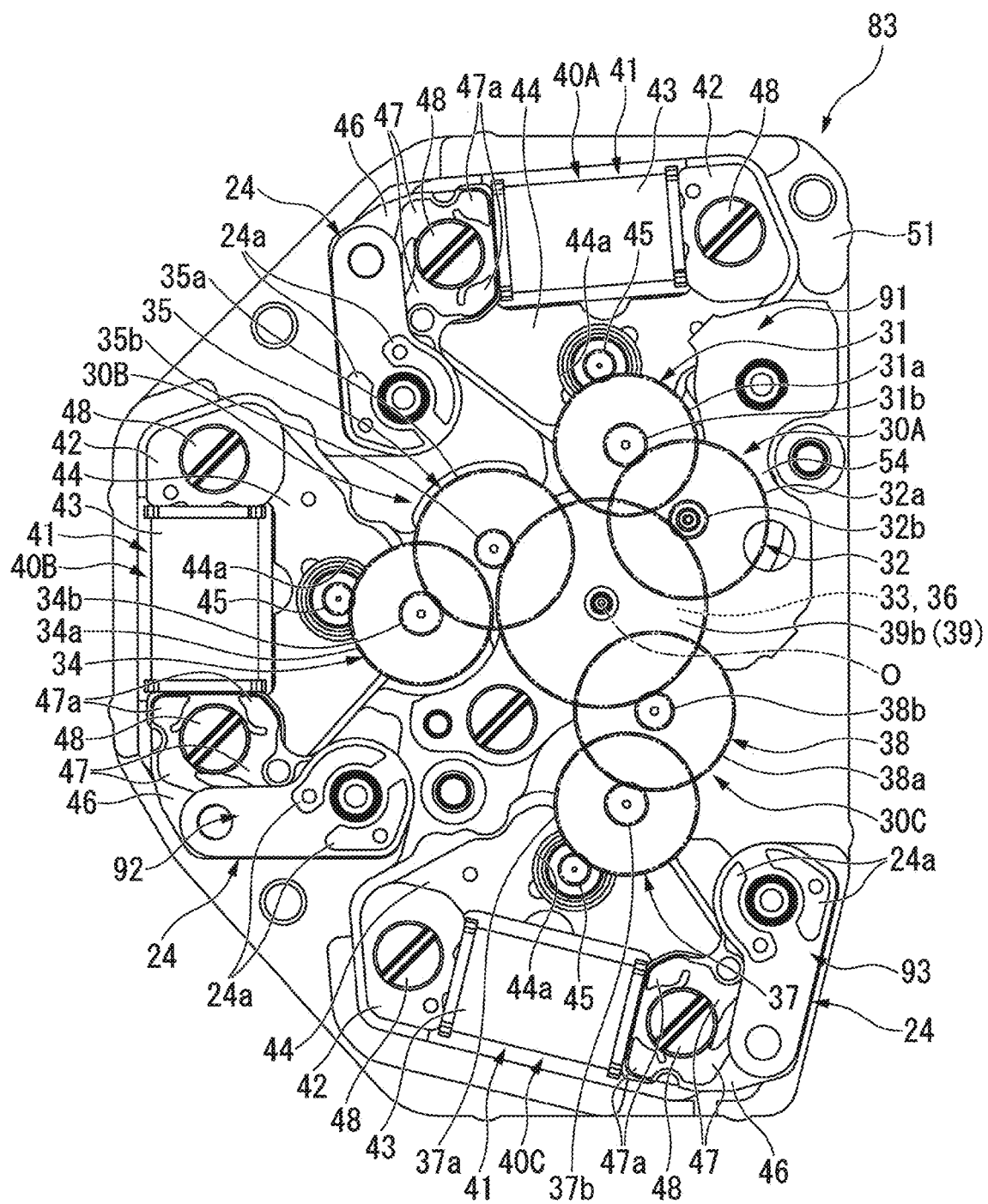
FIG. 13 is a plan view of an example of an internal configuration of a mechanism module according to the present embodiment as viewed from a front side.
Figure 14:
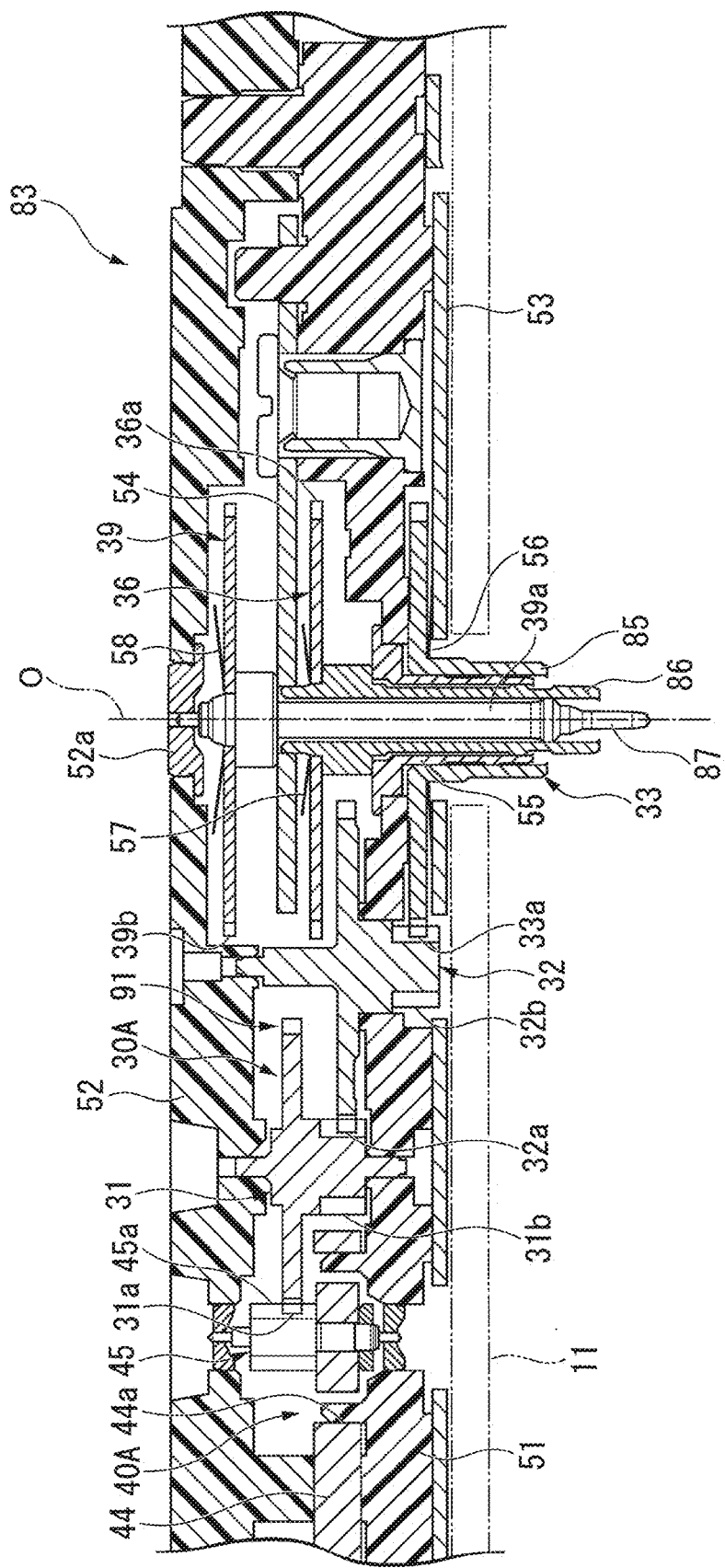
FIG. 14 is a cross-sectional view of an example of the internal configuration of the mechanism module according to the present embodiment as viewed from a side surface.

FIG. 13 is a plan view of an example of an internal configuration of the mechanism module according to the present embodiment as viewed from a front side. FIG. 14 is a cross-sectional view of an example of the internal configuration of the mechanism module according to the present embodiment as viewed from a side surface.

As shown in FIG. 13, the mechanism module 83 includes an hour hand drive mechanism 91, a minute hand drive mechanism 92, and a second hand drive mechanism 93. As shown in FIG. 14, the mechanism module 83 includes the main plate 51 and a train wheel bridge 52, an hour wheel holder 53 disposed on a back side of the main plate 51 and fixed to the main plate 51, and a center wheel bridge 54 disposed between the main plate 51 and the train wheel bridge 52. The main plate 51 and the train wheel bridge 52 support the hour hand drive mechanism 91, the minute hand drive mechanism 92, and the second hand drive mechanism 93.

In this example, a first motor 40A provided in the hour hand drive mechanism 91 will be described in order to show a relationship between the stator 201 and the main plate 51. A second motor 40B provided in the minute hand drive mechanism 92 and a third motor 40C provided in the second hand drive mechanism 93 are similar to the first motor 40A.

The first motor 40A is an example of the stepping motor 7, a rotor 45 is an example of the rotor 202, a stator 44 is an example of the stator 201, a rotor hole 44a is an example of the rotor accommodating hole 203, a magnetic core 42 is an example of the magnetic core 208, a coil wire 43 is an example of the coil 209, and a screw 48 is an example of the screw 220.

As shown in FIG. 13, the main plate 51 constitutes a wired board of the mechanism module 83. The main plate 51 is made of, for example, a resin material and is formed into a plate shape with an axial direction as the thickness direction.

The hour hand drive mechanism 91 rotates the hour hand 12. The hour hand drive mechanism 91 includes a first rotation shaft 85 to which the hour hand 12 is attached, the first motor 40A that drives the first rotation shaft 85, and an hour train wheel 30A that decelerates a rotational drive force of the first motor 40A to transmit the decelerated rotational drive force to the first rotation shaft 85.

The first motor 40A is a stepping motor in which the rotor 45 rotates by 180° in one step. The first motor 40A is provided at a position that does not overlap a rotation axis line O. The first motor 40A includes a coil block 41 including the magnetic core 42 and the coil wire 43 wound around the magnetic core 42, the stator 44 that is in contact with both end portions of the magnetic core 42 of the coil block 41, and the rotor 45 disposed in the rotor hole 44a of the stator 44.

The coil block 41 includes the magnetic core 42, the coil wire 43, and a coil lead wired board 46 fixed to one end portion of the magnetic core 42.

The magnetic core 42 extends along a direction orthogonal to the axial direction and a radial direction. The magnetic core 42 is fixed to the main plate 51 by screws 48 at both end portions thereof. The coil lead wired board 46 is a printed wired board. The coil lead wired board 46 is disposed on a front side of one end portion of the magnetic core 42, and is fastened together with the magnetic core 42 by the screws 48. The coil lead wired board 46 extends from a fixed portion with respect to one end portion of the magnetic core 42 toward a central portion of the main plate 51 when viewed from the axial direction. A pair of wirings 47 are formed on a surface of the coil lead wired board 46. An end portion of the coil wire 43 is welded to one end portion 47a of each wiring 47 on a magnetic core 42 side.

A relay wired board 24 is disposed on a front side of the coil lead wired board 46. The relay wired board 24 is a member having a thickness in the axial direction. The relay wired board 24 has a pair of relay wirings 24a extending from a surface to a back surface. The pair of relay wirings 24a contact the pair of wirings 47 of the first motor 40A on the back surface of the relay wired board 24, and contact terminals of a circuit block 23 on the surface of the relay wired board 24. Accordingly, the relay wired board 24 electrically connects the pair of wirings 47 of the coil lead wired board 46 and the circuit block 23.

The stator 44 is disposed inward of the magnetic core 42 in the radial direction. The stator 44 is fastened to the main plate 51 together with the magnetic core 42 by the pair of screws 48.

The rotor 45 is disposed inward of the magnetic core 42 in the radial direction. The rotor 45 is rotatably supported by the main plate 51 and the train wheel bridge 52 (see FIG. 4).

As shown in FIGS. 13 and 14, the hour train wheel 30A includes a first intermediate hour wheel 31, a second intermediate hour wheel 32, and an hour wheel 33. The first intermediate hour wheel 31 has a first intermediate hour gear wheel 31a and a first intermediate hour pinion 31b, and is rotatably supported by the main plate 51 and the train wheel bridge 52. The first intermediate hour gear wheel 31a meshes with a pinion 45a of the rotor 45 of the first motor 40A. The second intermediate hour wheel 32 has a second intermediate hour gear wheel 32a and a second intermediate hour pinion 32b, and is rotatably supported by the main plate 51 and the train wheel bridge 52. The second intermediate hour gear wheel 32a meshes with the first intermediate hour pinion 31b of the first intermediate hour wheel 31.

The hour wheel 33 is rotatably fitted to a center pipe 55 on the back side of the main plate 51. The center pipe 55 is held by the main plate 51. The center pipe 55 extends coaxially with the rotation axis line O and protrudes from the main plate 51 to the back side. That is, the hour wheel 33 is disposed coaxially with the rotation axis line O. The hour wheel 33 has a gear hour wheel 33a that meshes with the second intermediate hour pinion 32b of the second intermediate hour wheel 32. The hour wheel 33 is held from a back side of the hour wheel holder 53. The hour wheel 33 is biased toward a main plate 51 side by a first dial washer 56 disposed between the hour wheel holder 53 and the gear hour wheel 33a. An end portion of a back side of the hour wheel 33 protrudes from the hour wheel holder 53 to the back side. That is, the hour wheel 33 is the first rotation shaft 85. The hour hand 12 is attached to the end portion of the back side of the hour wheel 33.

<Clearance Portion of Main Plate 51>

As described above, the stator 201 (the stator 44) is screwed to the main plate 51 by the screws 220 (the screws 48).

That is, in the present embodiment, the stator 201 is installed such that the main plate surface 201b of the stator 201 faces the main plate 51.

Here, FIGS. 15A to 15D are cross-sectional views showing examples of clearance portions of the main plate 51 according to the present embodiment. Each of FIGS. 15A to 15D is a cross-sectional view corresponding to FIG. 12B showing the stator 201 in a state of being screwed to the main plate 51.

As described above, the stator 201 has the dross P10 (hereinafter, the dross P1 and dross P2 are referred to as the dross P10 when not distinguished) and a burr P20 (hereinafter a burr P2, burr P3, burr P4, and burr P5 are referred to as a burr when not distinguished) so as to protrude from the main plate surface 201b.

Figure 15A:
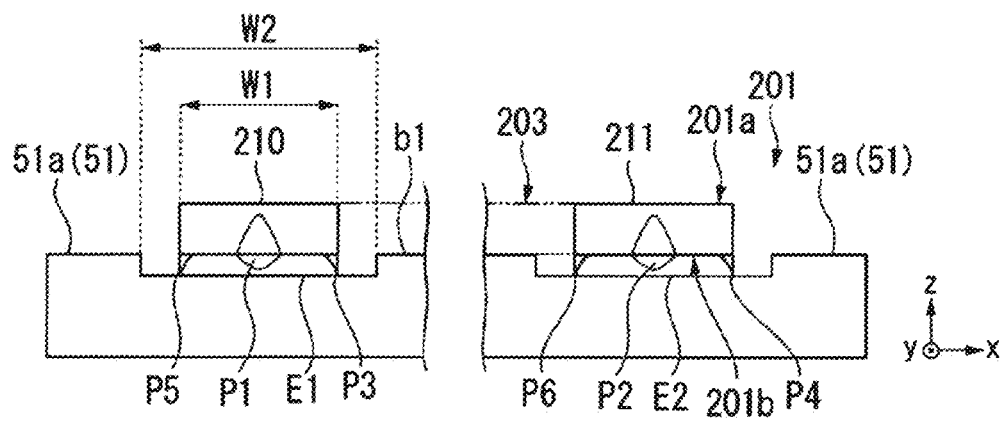
FIG. 15A is a cross-sectional view corresponding to FIG. 12B showing the stator in a state of being screwed to a main plate.

FIG. 15A shows an example in which a main plate 51a has clearance portions E1 and E2 at corresponding positions of the narrow-width portion 210 and the narrow-width portion 211 respectively. The main plate 51a is an example of the main plate 51.

The main plate surface 201b of the narrow-width portion 210 and the narrow-width portion 211 faces the main plate 51a. Since the narrow-width portion 210 and the narrow-width portion 211 have the dross P10 and the burr P20, the main plate 51a has the clearance portions E1 and E2 for avoiding contact between the main plate 51a and the dross P10 and the burr P20.

In this example, the clearance portion E1 is a concave notch for the dross P1, the burr P3, and the burr P5 of the narrow-width portion 210 to avoid coming into contact with the main plate 51a. Similarly, the clearance portion E2 is a concave notch for the dross P2, the burr P4, and the burr P6 of the narrow-width portion 211 to avoid coming into contact with the main plate 51a.

In an example shown in FIG. 15A, a length of the narrow-width portion 210 in the transverse direction (x-axis direction) is set as a width W1. A length of the clearance portion E1 in the same direction is set as a width W2. In this example, the width W1 is smaller than the width W2. The narrow-width portion 211 also has similar configuration.

In the example shown in FIG. 15A, the main plate 51a has a bank b1 which is a portion that is not a notch between the clearance portion E1 and the clearance portion E2.

Figure 15B:
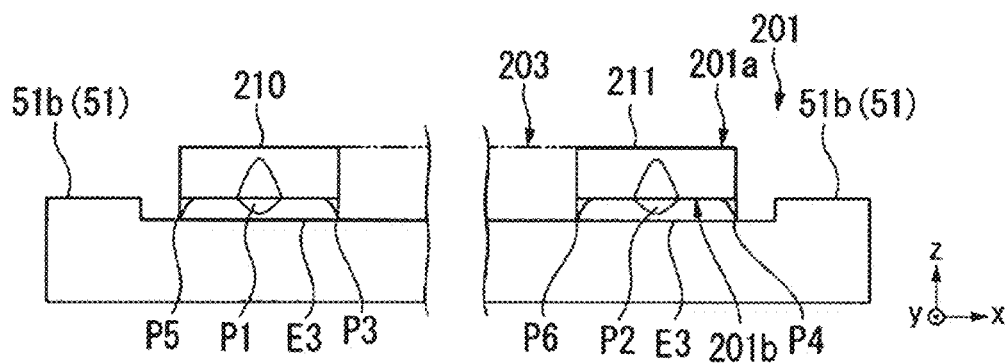
FIG. 15B is a cross-sectional view corresponding to FIG. 12B showing the stator in the state of being screwed to the main plate.

FIG. 15B shows an example in which a main plate 51b has a common clearance portion E3 at positions corresponding to the narrow-width portion 210 and the narrow-width portion 211. The main plate 51b is an example of the main plate 51.

In this example, the main plate 51b has a clearance portion for the dross P1 of the narrow-width portion 210 to avoid coming into contact with the main plate 51b, and a clearance portion for the dross P2 of the narrow-width portion 211 to avoid coming into contact with the main plate 51b as the common clearance portion E3. The clearance portion E3 is a concave notch for the dross P10 and the burr P20 of the narrow-width portion 210 and the narrow-width portion 211 to avoid coming into contact with the main plate 51b.

FIG. 15C shows an example of a clearance portion E4 of the main plate when the burr P20 is not generated in the narrow-width portion 210 and the narrow-width portion 211 or when the burr P20 is small enough to be ignored. A main plate 51c is an example of the main plate 51.

In this example, the narrow-width portion 210 has the dross P1. The clearance portion E4 of the main plate 51c is a concave notch for the dross P1 to avoid coming into contact with the main plate 51c. In addition, the narrow-width portion 211 has the dross P2. The clearance portion E5 of the main plate 51c is a concave notch for the dross P2 to avoid coming into contact with the main plate 51c.

Since the narrow-width portion 210 and the narrow-width portion 211 do not have the burr P20 or the burr P20 is small enough to be ignored, the clearance portion E4 and the clearance portion E5 may have a size that can make the dross P10 avoid coming into contact with the main plate 51c.

In an example shown FIG. 15C, the length of the narrow-width portion 210 in the transverse direction (x-axis direction) is set as a width W1. A length of the clearance portion E4 in the same direction is set as a width W3. In this example, the width is larger than the width W3. The narrow-width portion 211 also has similar configuration.

With this configuration, the main plate 51c can reduce a size of the notch. Therefore, the main plate 51c is provided with the notch, so that it is possible to suppress the decrease in strength.

Figure 15D:
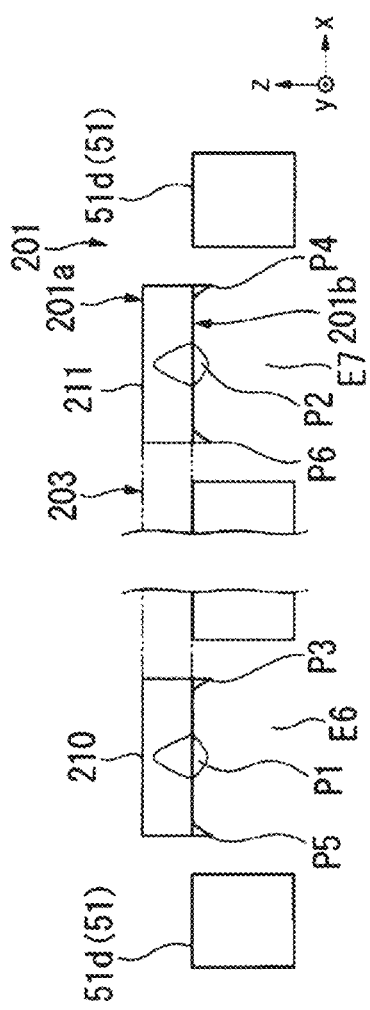
FIG. 15D is a cross-sectional view corresponding to FIG. 12B showing the stator in the state of being screwed to the main plate.

FIG. 15D is an example of a case where clearance portions E6 and E7 of a main plate 51d are through holes that penetrate the main plate 51d. The main plate 51d is an example of the main plate 51.

In this example, the clearance portion E6 for the dross P1 of the narrow-width portion 210 to avoid coming into contact with the main plate 51d is a through hole. Similarly, the clearance portion E7 for making the dross P2 of the narrow-width portion 211 avoid coming into contact with the main plate 51d is a through hole.

With this configuration, even when a size of the dross P10 is large, the main plate 51d can prevent the dross P10 from coming into contact with the main plate 51d.

In each of the examples shown in FIGS. 15A to 15D, a thickness of the main plate 51 at a portion where the stator 201 and the main plate 51 are engaged is 0.6 mm to 0.8 mm. On the other hand, depths of the clearance portions E1 and E2 shown in FIG. 15A, a depth of the clearance portion E3 shown in FIG. 15B, and the depths of the clearance portions E4 and E5 shown in FIG. 15C are about 0.1 mm.

However, in each of the examples shown in FIGS. 15A to 15D, sizes of the clearance portions E1 to E7 are not limited. Each of the clearance portions E1 to E7 may have a size that can make the dross P10 avoid coming into contact with the main plates 51a to 51d.

Although the stator 201 is described as being screwed to the main plate 51, the present invention is not limited to this example. The stator 201 and the main plate 51 can be fixed by a method other than screwing.

An object to be held by the stator 201 is not limited to the main plate 51. Another member such as a stator holding member may be disposed between the stator 201 and the main plate 51.

For example, the stator holding member has a concave clearance portion, and holds the stator 201 in contact with a portion of the main plate surface 201b. The thickness of the concave clearance portion is thinner than the other portion.

The main plate 51, the holding member, or the like may be any member that can dispose the stator 201 so that the narrow-width portion 210 and the narrow-width portion 211 face the main plate 51, the holding member, or the like.

<Summary of Effects of Embodiment>

As described above, in the present embodiment, the dross P10 is generated in the main plate surface 201b of the stator 201. The main plate surface 201b is a back surface of the train wheel surface 201a. Therefore, in the present embodiment, the dross P10 does not come into contact with the train wheel 11.

In the stator 201 according to the above embodiment, a surface where the dross P10 is generated and a surface where the burr P20 is generated are the same surface. Therefore, since neither the dross P10 nor the burr P20 exists in the train wheel surface 201a, the dross P10 and the burr P20 do not come into contact with the train wheel 11.

According to the above embodiment, the main plate 51 of the movement 82 includes the clearance portions E1 to E7. Therefore, the main plate 51 does not come into contact with the dross P10 and the burr P20.

Therefore, according to the embodiment of the present application, the main plate 51 does not need to be subjected to processing such as dross removal and burr removal, and manufacturability and assembling property are not impaired at the time of manufacturing the movement 82.

According to the above embodiment, the timepiece 1 includes the movement 82. That is, the main plate 51 of the timepiece 1 includes the clearance portions E1 to E7. Therefore, the main plate 51 does not come into contact with the dross P10 and the burr P20.

Therefore, according to the embodiment of the present application, the main plate 51 does not need to be subjected to the processing such as the dross removal and the burr removal, and the manufacturability and assembling property are not impaired at the time of manufacturing the timepiece 1.

The manufacturing method according to the above embodiment includes an installation process of installing the main plate surface 201b of the stator 201 so as to face the main plate 51. In the present embodiment, since the surface where the dross P10 and the burr P20 are generated is the main plate surface 201b, the dross P10 and the burr P20 do not contact the train wheel 11.

Although the embodiment of the present invention is described above with reference to the drawings, specific configurations are not limited to the embodiment described above. The present invention also includes structures in which design changes and the like are carried out without departing from the scope of the present invention.

What is claimed is:

1. A stator for a timepiece movement, comprising:
a stator plate having a first surface and a second surface opposite to the first surface, wherein the stator plate is made with magnetic material and has a circular hole for holding a rotor in the circular hole; and
two non-magnetic regions formed around the circular hole at a 180-degree interval between the circular hole and respective peripheries of the stator plate adjacent to the circular hole, wherein the two non-magnetic regions include chromium at a weight ratio of 15 wt % or more that is heat-diffused into the stator plate from the first surface of the stator plate in such a manner that the two non-magnetic regions each have a width that becomes progressively narrower from the first surface of the stator plate toward the second surface thereof, wherein the two non-magnetic regions each have a chromium bulge protruding from the first surface of the stator plate.

2. The stator according to claim 1, wherein the stator place has a plurality of burrs protruding around the circular hole from the first surface of the stator plate in the direction in which the chromium bulge protrudes from the first surface of the stator plate.

3. A timepiece comprising the stator according to claim 1.

4. A method for manufacturing a timepiece movement, comprising:
providing a base plate made of magnetic material, the base plate having a first surface and a second surface opposite to the first surface;
applying chromium on the first surface of the base plate;
irradiating a laser on the chromium applied on the base plate toward the first surface of the base plate to create a non-magnetic region inside the base plate in such a manner that the non-magnetic region has a width that becomes progressively narrower from the first surface of the base plate toward the second surface thereof;
pressing the base plate to form a stator plate that has a circular hole for accommodating a rotor, wherein the stator plate has two non-magnetic regions arranged around the circular hole at a 180-degree interval between the circular hole and two peripheries of the stator plate adjacent to the circular hole, and the two non-magnetic regions are formed with bulges protruding from the first surface of the stator plate;
providing a main plate in which at least one recessed space is formed; and
fixing the stator plate onto the main plate so that the first surface of the stator plate faces the main plate, wherein the bulges of the two non-magnetic regions are accommodated in the at least one recessed space formed in the main plate.

5. A timepiece movement comprising:
a stator plate having a first surface and a second surface opposite to the first surface, wherein the stator plate is made with magnetic material and has a circular hole for accommodating a rotor in the circular hole;
two non-magnetic regions formed in the stator plate around the circular hole at a 180-degree interval between the circular hole and respective peripheries of the stator plate adjacent to the circular hole, wherein the two non-magnetic regions are made mainly of chromium heat-diffused into the stator plate from the first surface thereof in such a manner that the two non-magnetic regions each have a width that becomes progressively narrower from the first surface of the stator plate toward the second surface thereof, and the two non-magnetic regions each have a chromium bulge protruding from the first surface of the stator plate away from the first surface; and
a main plate in which at least one recessed space is formed, wherein the stator plate is fixed onto the main plate so that the first surface of the stator plate faces the main plate, and the bulges of the two non-magnetic regions are accommodated in the at least one recessed space formed in the main plate.

6. The timepiece movement according to claim 5, wherein the two non-magnetic regions include chromium at a wright ratio of 15 wt % or more.

7. The timepiece movement according to claim 5, wherein the main plate is formed with two separate recessed spaces that accommodate therein the bulges of the two non-magnetic regions of the stator plate, respectively.

8. The timepiece movement according to claim 5, wherein the main plate is formed with one recessed space that accommodates therein the bulges of the two non-magnetic regions of the stator plate.

9. The timepiece movement according to claim 5, wherein the main plate is formed with two separate holes going through the main plate, and the two separate holes accommodate therein the bulges of the two non-magnetic regions of the stator plate, respectively.

* * * * *